(12) United States Patent
Barbot

(10) Patent No.: US 10,279,746 B2
(45) Date of Patent: May 7, 2019

(54) GLOVE BOX ARRANGEMENT, DASHBOARD ARRANGEMENT AND PASSENGER COMPARTMENT ARRANGEMENT

(71) Applicant: GM GLOBAL TECHNOLOGY OPERATIONS LLC, Detroit, MI (US)

(72) Inventor: Augustin Barbot, Ruesselsheim (DE)

( * ) Notice: Subject to any disclaimer, the term of this patent is extended or adjusted under 35 U.S.C. 154(b) by 37 days.

(21) Appl. No.: 15/623,468

(22) Filed: Jun. 15, 2017

(65) Prior Publication Data

US 2017/0361775 A1    Dec. 21, 2017

(30) Foreign Application Priority Data

Jun. 15, 2016    (DE) .......................... 10 2016 007 316

(51) Int. Cl.
| | |
|---|---|
| *B60R 7/06* | (2006.01) |
| *B62D 25/14* | (2006.01) |
| *B60N 3/00* | (2006.01) |
| *B60R 11/02* | (2006.01) |
| *B60R 11/00* | (2006.01) |

(52) U.S. Cl.
CPC ............... *B60R 7/06* (2013.01); *B60N 3/002* (2013.01); *B60R 11/02* (2013.01); *B62D 25/145* (2013.01); *B60R 2011/0005* (2013.01); *B60R 2011/0082* (2013.01); *B60R 2011/0085* (2013.01); *B60R 2011/0094* (2013.01)

(58) Field of Classification Search
CPC ... B60K 37/00; B60R 7/06; B60R 2011/0005; B60R 2011/0082; B60R 2011/0085; B60R 2011/0229; B62D 25/14; B62D 25/145

USPC .................................. 296/37.12, 70, 73, 74
See application file for complete search history.

(56) References Cited

U.S. PATENT DOCUMENTS

| | | | |
|---|---|---|---|
| 5,207,471 | A | 5/1993 | Mutschler et al. |
| 6,129,406 | A | 10/2000 | Dauvergne |
| | | (Continued) | |

FOREIGN PATENT DOCUMENTS

| | | |
|---|---|---|
| DE | 9418788 U1 | 5/1995 |
| DE | 202007011064 A1 | 10/2007 |
| | (Continued) | |

OTHER PUBLICATIONS

German Patent Office, German Search Report for German Application No. 102016007316.0, dated May 26, 2017.

*Primary Examiner* — Jason S Daniels
(74) *Attorney, Agent, or Firm* — Lorenz & Kopf, LLP

(57) ABSTRACT

A glove box arrangement for a motor vehicle includes a glove box and a pivoting element. The pivoting element can be moved between an idle position and an active position and includes an activity surface that is covered toward an exterior space in the idle position and accessible from the exterior space in the active position. In a dashboard arrangement, a crossbeam extends horizontally and transverse to a driving direction and includes a dashboard. A clearance area of the crossbeam extends in an exterior space that surrounds the dashboard and a glove box arrangement is mounted on the crossbeam in the clearance area. In a passenger compartment arrangement for a motor vehicle includes a front passenger seat and a glove box arrangement or with a dashboard arrangement. The glove box arrangement is arranged in the region of the front passenger seat.

19 Claims, 3 Drawing Sheets

(56) References Cited

U.S. PATENT DOCUMENTS

| | | | | |
|---|---|---|---|---|
| 2005/0218681 A1* | 10/2005 | DePue | ................... | B60N 3/002 |
| | | | | 296/37.12 |
| 2007/0267857 A1* | 11/2007 | Jonsson | .................... | B60R 7/06 |
| | | | | 280/752 |
| 2014/0183896 A1* | 7/2014 | Cho | .......................... | B60R 7/06 |
| | | | | 296/37.12 |
| 2017/0267184 A1* | 9/2017 | Huebner | ............. | B60R 11/0252 |

FOREIGN PATENT DOCUMENTS

| | | | | |
|---|---|---|---|---|
| DE | 102010054218 A1 | 8/2011 | | |
| EP | 0919431 A1 | 6/1999 | | |
| EP | 0958961 A2 | 11/1999 | | |
| EP | 1571044 A2 | 9/2005 | | |
| FR | 2990665 A1 * | 11/2013 | ............... | B60R 7/06 |
| GB | 2522837 A | 8/2015 | | |

* cited by examiner

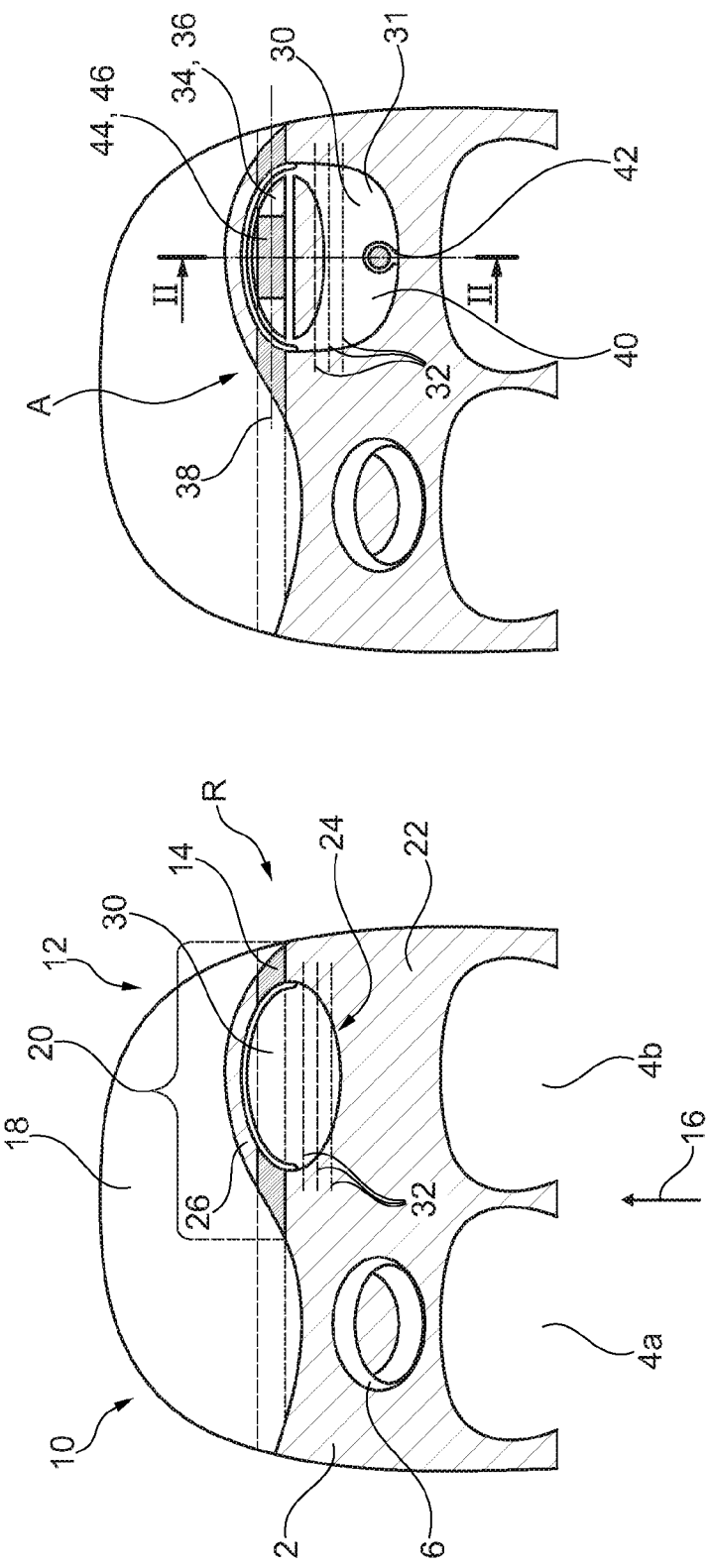

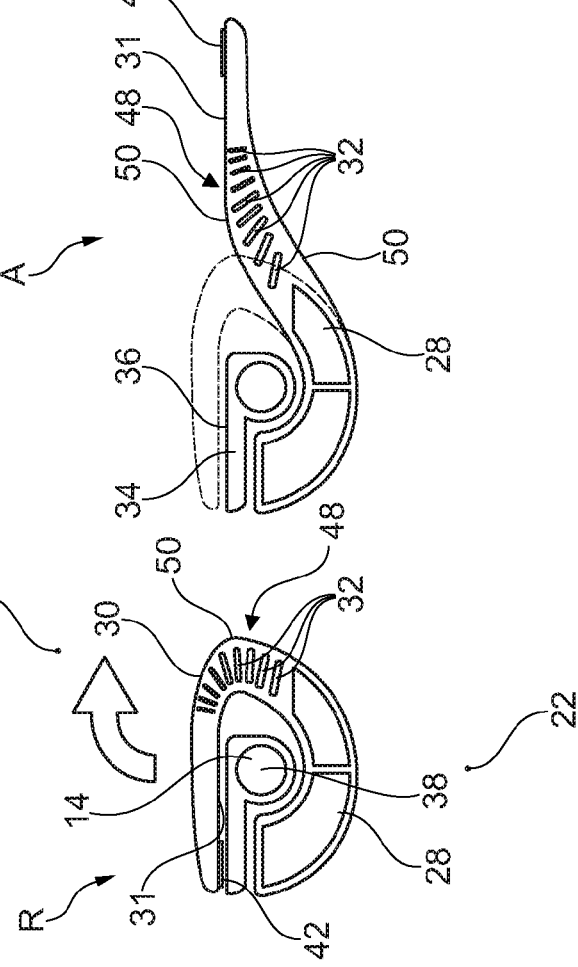

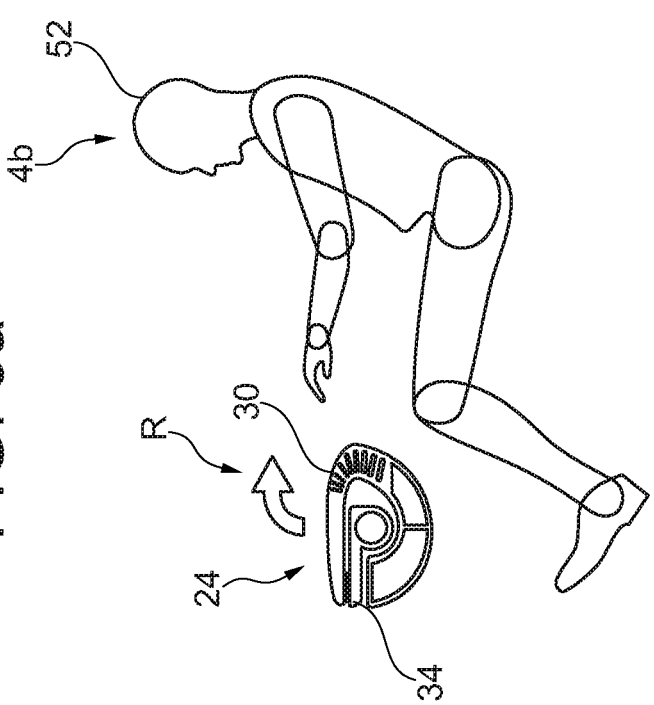
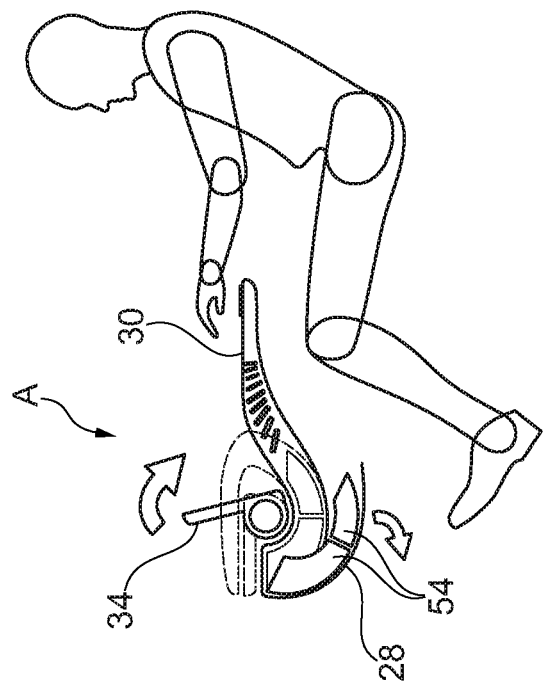

GLOVE BOX ARRANGEMENT, DASHBOARD ARRANGEMENT AND PASSENGER COMPARTMENT ARRANGEMENT

CROSS-REFERENCE TO RELATED APPLICATION

This application claims priority to German Patent Application No. 102016007316.0, filed Jun. 15, 2016, which is incorporated herein by reference in its entirety.

TECHNICAL FIELD

The present disclosure respectively relates to a glove box arrangement, a dashboard arrangement and a passenger compartment arrangement for a motor vehicle.

BACKGROUND

DE 696 04 698 T2 discloses interior equipment for a passenger car in the form of an instrument panel or dashboard. The instrument panel consists of a solid material block that is carried by at least one crossbeam mounted on the vehicle. Suitable recesses for accommodating equipment parts are provided in the material block. The parts consist, for example, of a combined instrument unit that includes different glove boxes.

SUMMARY

The present disclosure provides an enhanced solution for a glove box in a motor vehicle. Preferred or advantageous embodiments of the present disclosure, as well as other categories of the present disclosure, can be gathered from the claims, the following description and the attached figures.

The glove box arrangement for a motor vehicle includes at least a glove box and at least a pivoting element. The pivoting element can be moved between an idle position and an active position. The pivoting element includes an activity surface. In the idle position, the activity surface is covered toward an exterior space. In the active position, the activity surface is accessible from an exterior space. The glove box is any glove box that respectively includes a hinged cover or a hinged tray, which can be pivoted downward in the designated installation state.

All specifications in the present description, such as "top," "bottom," "in front," "behind," etc., refer to the designated installation state of the respective object in a motor vehicle intended or chosen for the installation. If applicable, the directional specifications also refer to a horizontally positioned vehicle on level ground.

According to the present disclosure, new functions for use by passengers can be integrated into a motor vehicle in that an activity surface can be used for various activities in the active position. The perception or experience of a passenger in the motor vehicle is thereby made more pleasant and as enjoyable as that of the driver. This is achieved in that the pivoting element or its activity surface respectively becomes a location or a place for activities of various types after it has been transferred from the idle position into the active position. However, the glove box still is respectively available or designated as a stowage space in unchanged form.

In a preferred embodiment, the pivoting element is an extension of the glove box. With respect to its outer contour, the pivoting element is integrally molded on the glove box in a smooth and seamless fashion. The glove box and the pivoting element are therefore optically perceived as an integral unit by an observer, which in turn creates a pleasant passenger compartment experience for the observer in the motor vehicle.

In a preferred embodiment, the pivoting element includes a movable joint structure. The joint structure is surrounded by a flexible and/or pliable and/or elastic outer cover. In this case, the joint structure allows the motion of the pivoting element between the idle position and the active position and guides the pivoting element accordingly during this motion. In this way, the outer cover provides the pivoting element with an optically appealing appearance and blocks the view of the joint structure, as well as access thereto. Passengers are thereby prevented, for example, from pinching or injuring themselves on the joint structure. Consequently, the outer cover respectively forms part of the pivoting element or the glove box arrangement.

In a preferred variation of this embodiment, at least a section of the glove box is also surrounded by the outer cover in addition to the pivoting element. At least all visible areas of the glove box, particularly the entire glove box, is preferably surrounded by the outer cover. The visible area is the area of the surface of the glove box, which is visible by persons in the designated installation state or during the regular operation of the glove box arrangement. The glove box and the pivoting element therefore form an optically coherent unit.

In a preferred embodiment, the pivoting element is movable in that it can be pivoted about at least one pivoting axis. If multiple pivoting axes are provided, they extend parallel to one another. In this way, a crawler-like or chain-like articulation of individual cascaded pivot joints is realized. Once the glove box arrangement has been installed in the corresponding vehicle as designated, the pivoting axis extends transverse to the driving direction of the motor vehicle and, horizontally when the vehicle is positioned on level ground. If the glove box arrangement or the pivoting element is located, in front of a passenger seat, the corresponding passenger can pivot the pivoting element toward the seat about the pivoting axis, which extends transversely and horizontally in front of the passenger, to transfer the pivoting element into the active position or away from the seat to transfer the pivoting element into the idle position. In the active position, the pivoting element is located closer to the person on the seat whereas the person has more free space in the idle position because the pivoting element is pivoted away from the seat.

In a cross section perpendicular to the pivoting axis, a snail shape of sorts with a single volute is therefore realized for a connected arrangement of glove box and pivoting element in the idle position. A transfer into the active position causes approximately half of the shape, namely the shape of the pivoting element, to change into an elongate shape that particularly extends toward a passenger seat as explained above.

In a preferred embodiment, the glove box arrangement includes an auxiliary element. The auxiliary element has a visible surface. In the idle position of the pivoting element, the visible surface is covered toward the exterior space by the pivoting element. The visible surface is visible from the exterior space in the active position of the pivoting element. In this case, the pivoting element therefore fulfills a double function, namely the function of making available the activity surface in the active position on the one hand and the function of exposing the visible surface such that it becomes visible from the exterior space, as well as covering and thereby protecting the visible surface in the idle position, on the other hand. In the idle position, the pivoting element is on the one hand—as explained above—spaced apart from the seat of a passenger, i.e. it serves for creating more free space on the seat, and on the other hand serves for respectively covering the visible surface or the auxiliary element.

In a preferred variation of this embodiment, the auxiliary element can be pivoted about an auxiliary axis. In this way, the auxiliary element can also be easily directed toward a passenger seat or the passenger seated thereon, particularly with respect to its visible surface, such that this passenger has a clear view of the visible surface from the exterior space in the active position of the pivoting element.

In a preferred variation of the embodiment, the auxiliary axis extends parallel to the pivoting axis. In this way, the pivoting element and the auxiliary element can carry out approximately identical motions, namely respective pivoting motions about parallel axes, and therefore be operated unitarily. In addition, nested constructions can thereby be realized, e.g., to design the pivoting element and the auxiliary element with a cross sectional fan-like mobility.

In a preferred embodiment, the activity surface forms or includes a tray or a storage surface and/or a touchscreen and/or an input unit for a media player and/or a light source and/or a receptacle (e.g. a recess, cavity or holder) for an article of daily use. In a glove box arrangement with an auxiliary element, the auxiliary element alternatively or additionally includes a display screen and/or a touchscreen and/or a mirror and/or a light source. For example, the articles of daily use are makeup utensils and the input unit is a keypad, a touchpad or the like.

The above-defined objective of the present disclosure is also attained with a dashboard arrangement. The dashboard arrangement and at least some of its embodiments, as well as the corresponding advantages, are described above by analogy in connection with the glove box arrangement.

The dashboard arrangement for a motor vehicle includes a crossbeam, which in the designated installation state extends horizontally and transverse to the driving direction of a motor vehicle intended or chosen for the installation. The dashboard arrangement includes a dashboard. In the installation state, at least a clearance area of the crossbeam extends in an exterior space. The exterior space surrounds the dashboard. The dashboard arrangement includes a glove box arrangement. The glove box arrangement is mounted on the crossbeam in the clearance area.

After the designated installation, the "exterior space" represents the surroundings of the dashboard and therefore typically a vehicle interior that is located outside the dashboard, particularly a passenger compartment. The glove box arrangement may include any glove box with or without corresponding attachment parts or auxiliary components. The clearance area is the area of the crossbeam, on which the glove box is mounted. It is the area located, in front of the front passenger seat in the installation state. "Outside" means, that the crossbeam is in the installation state located between the dashboard and the front passenger seat.

According to the present disclosure, a glove box arrangement, which is located outside the dashboard, is therefore mounted on the crossbeam. Consequently, the glove box arrangement or glove box appears visually detached, dissociated or separated from the dashboard and self-contained.

In a preferred embodiment, at least a section of the glove box arrangement is spaced apart from the dashboard. The entire glove box arrangement is preferably spaced apart from the dashboard and therefore optically appears to be connected to the dashboard with the aid of the crossbeam only, if at all, and otherwise levitating. Consequently, a clearance or gap between the facing outer surfaces of the glove box arrangement and the dashboard is formed at least in the section of the glove box arrangement. The optical impression of a levitating glove box arrangement is thereby achieved even though it appears as if the crossbeam would extend through the glove box or the glove box arrangement, respectively. According to the present disclosure, this represents another step toward a dashboard with a simplified visual design, as well as such a motor vehicle passenger compartment, without having to develop a new architecture (the crossbeam may be identical to existing solutions). The glove box or the glove box arrangement is virtually detached from the dashboard and self-contained.

In a preferred embodiment, the glove box arrangement is a glove box arrangement of the above-described type. Consequently, the respective advantages described above also apply to the respective dashboard arrangement.

In a preferred variation of this embodiment, the crossbeam extends through the glove box arrangement, but not through its glove box. Consequently, the glove box arrangement can be easily mounted on the crossbeam, but the glove box can be used in its entirety—without impediment by the crossbeam.

In a preferred variation of this embodiment, the auxiliary axis extends within the crossbeam. Consequently, the auxiliary element can be pivoted about the crossbeam, wherein this pivoting motion not only can be easily realized technically, but also has an optically appealing effect. The auxiliary element may particularly encompass a crossbeam with circular cross section and slide on its circular circumferential surface.

The above-defined objective of the present disclosure is also attained with a passenger compartment arrangement. The passenger compartment arrangement for a motor vehicle includes a front passenger seat of a motor vehicle and a glove box arrangement or a dashboard arrangement. The glove box arrangement is arranged in the region of the front passenger seat, particularly arranged centrally in front of the front passenger seat. The passenger compartment arrangement and at least some of its embodiments, as well as the corresponding advantages, are already described above in connection with the glove box arrangement and the dashboard arrangement. Their advantages in the passenger compartment arrangement especially apply to the front passenger seat or a front passenger of the motor vehicle, who is seated on the front passenger seat.

In the active position, the pivoting element particularly is located closer to the front passenger seat than in the idle position. In this case, the glove box arrangement and the dashboard arrangement are in their installation state in the motor vehicle. In the designated installation state, the pivoting element therefore faces a seat, in this case particularly the front passenger seat, in the active position and respectively faces away or is located distant from this seat in the idle position. In the active position, the activity surface particularly faces or is directed toward the front passenger seat. In this way, a passenger can very easily use or view the activity surface.

The present disclosure is based on the fundamental idea of perceiving the dashboard and the glove box or a glove box arrangement of a motor vehicle as two separate elements. Although it is known to use a crossbeam (Cross Car Beam) for motor vehicle designs, this crossbeam should be optically visible, particularly on the front passenger side, due to the inventive dashboard design. The present disclosure is based on the idea of respectively mounting the glove box or the glove box arrangement on the crossbeam at this location and to thereby create a levitating appearance thereof. According to the present disclosure, an upper part of the glove box arrangement, namely the pivoting element, can be opened toward a passenger. The glove box or the glove box arrangement is made of a rigid plastic structure that is covered with a semi-soft material. This cover material is filled with multiple plastic frames that stabilize the cover, as well as guide and thereby make it possible to open the upper part, namely the pivoting element. The lower section of the glove box arrangement is a conventional glove box or a conventional glove box opening.

According to the present disclosure, a glove box or a glove box arrangement, which includes two elements, is therefore mounted on a crossbeam. A first element is formed by the upper part of the arrangement or an extension of the glove box, which is particularly realized in the form of a snail shell and can be opened in the direction of the front passenger. This element can have multiple functions, for example the function of a storage surface, a touch-sensitive key panel on the inner side of the cover with a display screen in the interior or a makeup table with a mirror and makeup samples. The second, lower element represents a classic glove box. The arrangement on the crossbeam makes it possible to create a levitating appearance of the glove box or the glove box arrangement, respectively.

BRIEF DESCRIPTION OF THE DRAWINGS

The present disclosure will hereinafter be described in conjunction with the following drawing figures, wherein like numerals denote like elements.

FIG. 1a shows a passenger compartment of a motor vehicle, in which the pivoting element is in the idle position;

FIG. 1b shows a passenger compartment of a motor vehicle, in which the pivoting element is in the active position;

FIG. 2a shows a cross section through the glove box arrangement, in which the pivoting element is in the idle position;

FIG. 2b shows a cross section through the glove box arrangement, in which the pivoting element is in the active, first pivoting position;

FIG. 2c shows cross sections through the glove box arrangement, in which the pivoting element is in the active, second pivoting position;

FIG. 3a shows the glove box arrangement with a front passenger and the glove box in the closed position; and.

FIG. 3b shows the glove box arrangement with a front passenger and the glove box in the open position.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIGS. 1a, b show a detail of a passenger compartment 2 of a motor vehicle in the form of a top view. A driver seat 4a and a front passenger seat 4b are arranged in the passenger compartment 2. A steering wheel 6 is assigned to the driver seat 4a. A passenger compartment arrangement 10 for the motor vehicle is arranged in the passenger compartment 2. The front passenger seat 4b forms part of the passenger compartment arrangement 10. A dashboard arrangement 12 forms part of the passenger compartment arrangement 10. The dashboard arrangement 12 includes a crossbeam 14. The dashboard arrangement 12 and the passenger compartment arrangement 10 are in their designated installation state in the motor vehicle. In this installation state, the crossbeam 14 extends transverse to a driving direction 16 of the motor vehicle, which is indicated with an arrow. The driving direction 16 is the direction, in which the motor vehicle moves while driving straight forward.

The crossbeam 14 in the motor vehicle also extends horizontally when the vehicle is positioned horizontally, for example parked on a horizontal surface. The dashboard arrangement 12 also includes a dashboard 18. The crossbeam 14 extends within the dashboard 18 in certain sections (as indicated with broken lines), i.e. it is not visible from the passenger compartment 2. In a clearance area 20, however, the crossbeam 14 extends in an exterior space 22 (as illustrated with continuous lines), which in this case is the part of the passenger compartment 2 that is accessible to persons in the motor vehicle. The exterior space 22 also surrounds the dashboard 18.

The dashboard arrangement 12 also includes a glove box arrangement 24. The glove box arrangement 24 is mounted on the crossbeam 14 in the clearance area 20. The entire glove box arrangement 24 is spaced apart from the dashboard 18. In other words, a gap 26 is respectively formed between opposing or spaced-apart surfaces of the glove box arrangement 24 and the dashboard 18. The glove box arrangement 24 is arranged in the region of the front passenger seat 4b. In this case, it is particularly arranged centrally in front of the front passenger seat 4b referred to the driving direction 16.

The glove box arrangement 24 includes a pivoting element 30 and a glove box 28, which is not visible in FIGS. 1a, b because it is covered by the pivoting element 30. The pivoting element 30 can be moved between an idle position R, which is illustrated in FIG. 1a, and an active position A, which is illustrated in FIG. 1b. The pivoting element 30 includes an activity surface 31, which is only visible in FIG. 1b because it is accessible from the exterior space 22 in the active position A. In the idle position R according to FIG. 1a, it is covered toward the exterior space 22. In order to transfer the pivoting element 30 from the idle position R into the active position A and back into the idle position, it can be pivoted about multiple parallel pivoting axes 32, of which only a few are exemplified in the figures.

The glove box arrangement 24 also includes an auxiliary element 34 with a visible surface 36. According to FIG. 1a, the visible surface 36 is covered toward the exterior space 22 by the pivoting element 30 in the idle position R of the pivoting element 30. According to FIG. 1b, the visible surface 36 is visible from the exterior space 22 in the active position A of the pivoting element 30. The auxiliary element 34 can be pivoted about an auxiliary axis 38. The auxiliary axis 38 extends parallel to the pivoting axis 32.

A section of the activity surface 31 forms a tray 40, on which a front passenger, who is seated on the front passenger seat 4b, can store objects in the active position A. The activity surface 31 also includes an input unit 42 for a media player, in this case a car stereo system of the motor vehicle. The auxiliary element 34 includes a display screen 44 or a mirror 46 in an alternative embodiment.

FIG. 2 shows the glove box arrangement 24 according to FIG. 1 in the form of a section along the line II-II, in which the glove box 28 is arranged on the bottom and the pivoting element 30 is arranged on the top. FIG. 2a shows the idle position R whereas FIGS. 2b, c show the active position A.

The idle position R is also indicated with broken lines in FIGS. 2b, c. The transfer from the idle position R into the active position A is realized in the form of a pivoting motion about the pivoting axes 32, which is indicated with an arrow in FIG. 2a. A movable joint structure 48 similar to a chain link arrangement or a crawler arrangement is realized due to the cascaded arrangement of the pivoting axes 32.

The pivoting element 30 is realized in the form of an extension of the glove box 28. The pivoting element 30 includes the movable joint structure 48, which is surrounded by a flexible outer cover 50. The glove box 28 is also surrounded by the outer cover 50. FIG. 2 once again elucidates that the activity surface 31 is covered toward the exterior space 22 in the idle position R, but accessible from the exterior space 22 in the active position A. In the idle position R of the pivoting element 30, the auxiliary element 34 with the visible surface 36 is covered toward the exterior space 22 by the pivoting element 30. However, the visible surface 36 is visible from the exterior space 22 in the active position A of the pivoting element 30.

FIG. 2a shows a first pivoting position and FIG. 2b shows a different second pivoting position of the auxiliary element 34 about the auxiliary axis 38. The transfer between the two pivoting positions is indicated with an arrow in FIG. 2c. The first pivoting position is illustrated with broken lines in FIG. 2c.

The crossbeam 14 in fact extends through the glove box arrangement 24, but not through the glove box 28. In addition, the auxiliary axis 38 lies within the crossbeam 14, in this case in its center.

FIG. 3a shows the glove box arrangement 24 of FIGS. 1a, b in the form of an illustration according to FIG. 2a, in which a front passenger 52 is seated on the front passenger seat 4b. An arrow in FIG. 3a once again indicates how the pivoting element 30 is transferred from the idle position R into the active position A according to FIG. 3b such that it can be easily reached and operated by the front passenger 52. In addition, the upper arrow in FIG. 3b once again shows how the auxiliary element 34 is transferred into an upwardly pivoted position according to FIG. 2c. A lower arrow in FIG. 3a furthermore indicates how the glove box 28 is pivoted downward and thereby opened. The closed position of the glove box 28 is indicated with broken lines. The interior of the glove box 28 forms a stowage space 54.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A glove box arrangement for a motor vehicle comprising:
    a glove box; and
    a pivoting element that is an extension of the glove box, the pivoting element including a movable joint structure surrounded by a flexible outer cover, the pivoting element movable between an idle position and an active position, wherein the pivoting element includes an activity surface covered on an exterior space in the idle position and accessible from the exterior space in the active position.

2. The glove box arrangement according to claim 1, wherein at least a section of the glove box is surrounded by the outer cover.

3. The glove box arrangement according to claim 1, wherein the pivoting element is pivotable about a plurality of pivot axes for movement between the idle position and the active position.

4. The glove box arrangement of claim 3, wherein the plurality of pivot axes is spaced apart and substantially parallel.

5. The glove box arrangement according to claim 1, wherein the activity surface comprises at least one of a tray, a touchscreen, an input unit for a media player, a light source and/or a receptacle for an article of daily use.

6. The glove box arrangement according to claim 1, wherein the glove box arrangement further comprises an auxiliary element having a visible surface covered toward the exterior space by the pivoting element in the idle position of the pivoting element and visible from the exterior space in the active position of the pivoting element.

7. The glove box arrangement according to claim 6, wherein the auxiliary element is pivotable about an auxiliary axis.

8. The glove box arrangement according to claim 7, wherein the pivoting element is pivotable about a pivoting axis for moving between the idle position and the active position; and
    wherein the auxiliary axis extends parallel to the pivoting axis.

9. The glove box arrangement according to claim 6, wherein the auxiliary element in the glove box arrangement comprises at least one of a display screen, a touchscreen, a mirror and/or a light source.

10. A dashboard arrangement for a motor vehicle comprising:
    a crossbeam configured to extend horizontally and transverse to a driving direction of the motor vehicle in a designated installation position;
    a dashboard supported on the crossbeam, the dashboard having a clearance area; and
    a glove box arrangement mounted on the crossbeam in the clearance area, the glove box arrangement including:
        a glove box;
        a pivoting element movable between an idle position and an active position, the pivoting element including an activity surface covered on an exterior space in the idle position and accessible from the exterior space in the active position; and
        an auxiliary element having a visible surface covered toward the exterior space by the pivoting element in the idle position of the pivoting element and visible from the exterior space in the active position of the pivoting element, wherein the auxiliary element is pivotable about an auxiliary axis that lies within the crossbeam.

11. The dashboard arrangement according to claim 10, wherein at least a section of the glove box arrangement is spaced apart from the dashboard.

12. The dashboard arrangement according to claim 10, wherein the crossbeam extends through the glove box arrangement but not through its glove box.

13. A dashboard arrangement for a motor vehicle comprising:

a crossbeam configured to extend horizontally and transverse to a driving direction of the motor vehicle in a designated installation position;

a dashboard supported on the crossbeam, the dashboard having a clearance area; and a glove box arrangement mounted on the crossbeam in the clearance area, the glove box arrangement including:

a glove box;

a pivoting element that is an extension of the glove box, the pivoting element being flexible about at least one pivot axis for movement between an idle position and an active position, the pivoting element and the glove box being volute in shape in the idle position, the pivoting element elongated from the glove box in the active position, the pivoting element including an activity surface hidden from an exterior space in the idle position and accessible from the exterior space in the active position.

14. The dashboard arrangement of claim 13, wherein the pivoting element includes a movable joint structure surrounded by a flexible outer cover.

15. The dashboard arrangement of claim 13, wherein the pivoting element is pivotable about a plurality of pivot axes for movement between the idle position and the active position.

16. The dashboard arrangement of claim 15, wherein the plurality of pivot axes are substantially perpendicular.

17. The dashboard arrangement of claim 13, wherein the glove box arrangement further comprises an auxiliary element having a visible surface covered toward the exterior space by the pivoting element in the idle position of the pivoting element and visible from the exterior space in the active position of the pivoting element.

18. The glove box arrangement according to claim 17, wherein the auxiliary element is pivotable about an auxiliary axis.

19. The glove box arrangement according to claim 18, wherein the auxiliary axis lies within the cross beam.

* * * * *